Patented Aug. 19, 1924.

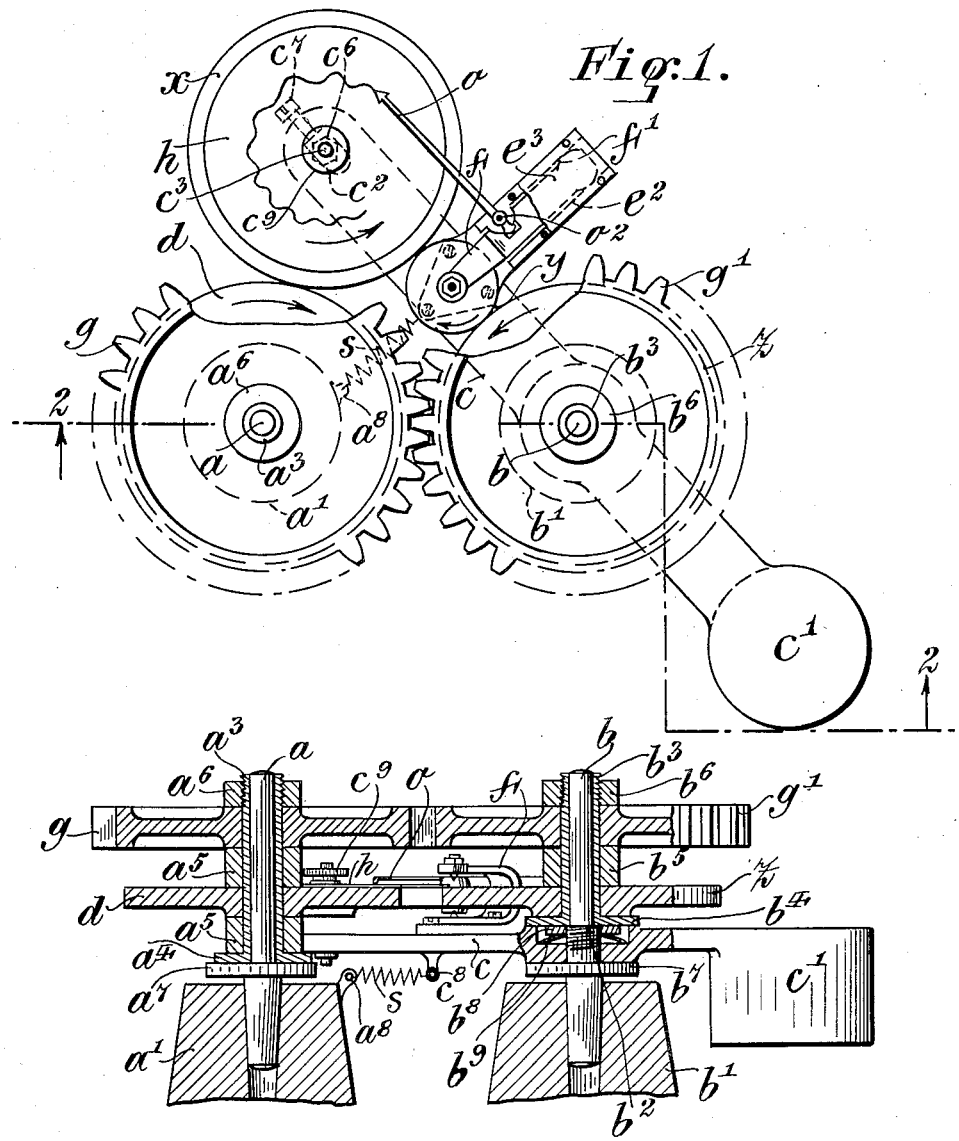

1,505,515

UNITED STATES PATENT OFFICE.

GOTTFRIED WIRRER, OF PLAINFIELD, NEW JERSEY, ASSIGNOR TO INTERNATIONAL MOTOR COMPANY, OF NEW YORK, N. Y., A CORPORATION OF DELAWARE.

APPARATUS FOR INDICATING DIFFERENCES IN ANGULAR VELOCITY IN ROTATING MEMBERS.

Application filed September 12, 1923. Serial No. 662,360.

*To all whom it may concern:*

Be it known that I, GOTTFRIED WIRRER, a citizen of the Swiss Republic, residing in Plainfield, in the State of New Jersey, have invented certain new and useful Improvements in Apparatus for Indicating Differences in Angular Velocity in Rotating Members, of which the following is a specification, reference being had to the accompanying drawings, forming a part hereof.

This invention relates to improvements in apparatus for indicating differences in angular velocity in two rotating members. The principle applied in the improved apparatus is that involved in the inter-action of three discs having rolling contact and arranged to rotate in a common plane with their axes in the same plane, the two outer discs being mounted on fixed centers, the middle disc being capable of displacement in a direction transverse to the plane including the axes of the discs. If the angular velocity of the two outer discs is exactly proportionate to their diameters, the middle disc which is driven by frictional contact with the outer disc will rotate without displacement of its axes. A differential angular velocity between the outer discs, however, will result in a proportionate displacement of the axis of the middle disc. The improved apparatus includes three discs of this nature in which the middle disc is operatively associated with an indicating mechanism whereby suitable indication of the differential angular velocity between the two outer discs may be obtained. Such apparatus is advantageously used to indicate the difference in angular velocity between two rotating gear wheels, transmission drive shafts or any other rotating members one of which, under normal conditions, should rotate at a speed proportional to the other. It will be apparent that if the two outer discs are caused to rotate in synchronism respectively with the two rotating members any difference in their angular velocity will be shown by the indicating mechanism.

The improved apparatus is particularly useful in testing the teeth of gear wheels to indicate inaccuracies in the working faces of the teeth. If the teeth of one or both of a pair of co-acting gears be inaccurately formed and one of the pair is rotated with constant angular velocity the other gear will be caused to have an irregular movement. If the angular velocity of each gear be transmitted proportionately to the respective outer discs, the middle disc will be displaced in an irregular manner and an indication thus obtained of the inaccuracies in the working faces of the teeth.

In order that the invention may be clearly understood and readily carried into effect the same will now be described more fully with reference to the accompanying drawings illustrating a preferred embodiment thereof in which;

Figure 1 is a view of the apparatus in plan showing the relationship of the parts.

Figure 2 is a vertical section taken on the planes indicated by the broken lines 2—2 in Figure 1 and looking in the direction of the arrows.

Figure 3:
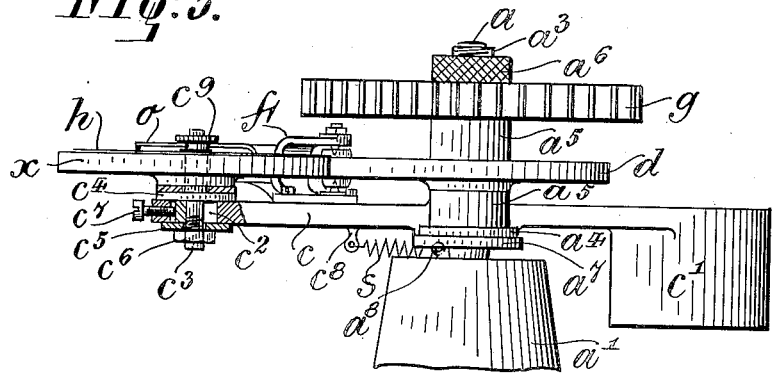
Figure 3 is a view in side elevation of the apparatus looking from the left in Figure 1.
Figure 4:
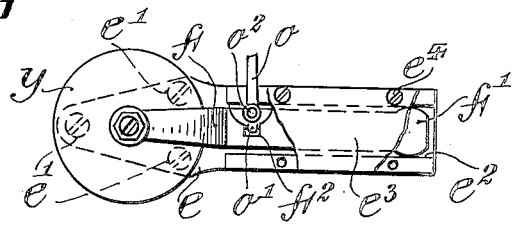
Figure 4 is a view in plan of the indicating mechanism.
Figure 5:
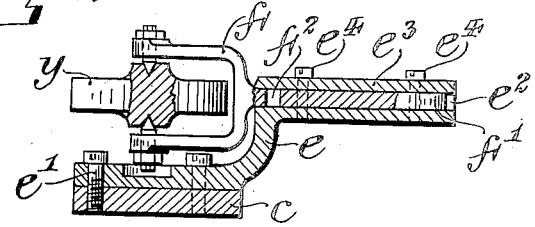
Figure 5 is a view in side elevation partly in section of the indicating mechanism shown in Figure 4.

In the drawings a preferred embodiment of the improved machine has been illustrated wherein the friction discs are caused to rotate in synchronism, respectively, with two inter-acting gears, the teeth of which are to be tested, but it will be evident to those skilled in the art that the two gears may be readily replaced by devices transmitting rotary motion from two transmission drive shafts or other rotating members the relative angular velocities of which are to be tested.

Figure 6:
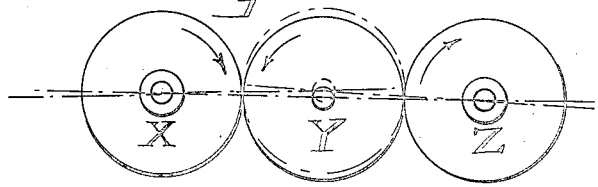
Figure 6 is a diagrammatic view of three discs in rolling contact illustrating the principle of operation of the invention.

Reference will first be had to Figure 6 which illustrates the principle applied in the improved machine, the three discs X, Y and Z being shown as having rolling contact and arranged to rotate in a common plane with their axes in the same plane. Discs X and Z are mounted on fixed centers while the middle disc Y is floating, that is, its axis is capable of movement in a line transverse to the plane including the axes of the other discs. It will be evident that if discs X and Z are rotated in opposite directions at the same angular velocity, the middle disc Y will rotate with no tendency for displacement, but if discs X and Z are rotated in opposite directions with different angular velocities the differential will cause a displacement of the axis of disc Y in a direction transverse to the plane including the axes of X and Z as indicated in dotted lines in Figure 6.

This principle is applied in the illustrated embodiment to a gear testing machine. Referring to Figures 1 and 2 a pair of spindles $a$ and $b$ are mounted on relatively movable supports $a'$ and $b'$ so as to be relatively movable with respect to each other to accommodate gears $g$, $g'$ of different diameters for testing. Suitable mechanism to effect this relative movement will readily occur to those skilled in the art, and as it forms no part of the present invention, is not illustrated. Spindle $b$ is formed with a shoulder $b^2$ adapted to support for rotation on the spindle $a$ sleeve $b^3$ formed with a flange $b^4$ at its lower end. Carried with sleeve $b^3$ are friction disc $z$ and gear $g'$ suitably spaced by a spacing element $b^5$. The disc and gear are clamped to rotate as one with sleeve $b^3$ by means of the knurled head $b^6$ threaded onto the threaded end of sleeve $b^3$. Swinging freely on spindle $b$ is a supporting arm $c$ balanced by weight $c'$. This arm is supported for rotation upon a flange $b^7$ integral with spindle $b$. Supporting arm $c$ is held in place by nut $b^8$ and spring washer $b^9$. On the companion spindle $a$ the sleeve $a^3$ is rotatably supported upon a flange $a^7$ integral with spindle $a$. Sleeve $a^3$ is formed at its lower end with flange $a^4$ adapted to carry friction disc $d$ disposed in the same plane with friction disc $x$ but out of contact therewith. Also supported on sleeve $a^3$ is the gear $g$ in mesh with the gear $g'$. Disc $d$ and gear $g$ are supported in proper position on the flange $a^4$ by spacing elements $a^5$ and are rigidly clamped to rotate as one with sleeve $a^3$ by means of knurled head $a^6$ engaging the threaded end of the sleeve $a^3$.

The end of supporting arm $c$ remote from its counter-balance weight $c'$ is slotted as at $c^2$. A spindle $c^3$ is disposed in the slot $c^2$ and is supported on the arm $c$ by flange $c^4$. The spindle is retained in the slot in upright position by means of washer $c^5$ and nut $c^6$. It has a loose fit in slot $c^2$ and is adjustable lengthwise of the supporting arm by means of the screw $c^7$. Rotatably mounted on the spindle $c^3$ is the friction disc $x$ which is disposed in the same plane with friction discs $z$ and $d$. The friction disc $x$ is adapted to be maintained in rolling contact with the friction disc $d$ by a spring $s$ connected to the bracket $c^8$ on the supporting arm $c$ and the bracket $a^8$ on the support $a'$. Spring $s$ is of such length as to be always under tension and serves to maintain the friction disc $x$ always in frictional contact with disc $d$ for rotation thereby.

Secured to the supporting arm $c$ midway between the spindles $b$ and $c^3$ is a bracket $e$ rigidly secured to the arm as by screws $e'$. One arm of bracket $e$ is formed with a groove $e^2$ in which is adapted to reciprocate the end $f'$ of a bifurcated slide $f$ between the two arms of which is carried a friction disc $y$. To prevent movement of the disc $y$ in a vertical direction, the grooved arm of the bracket $e$ is provided with a cover $e^3$ removably secured to the bracket $e$ as by screws $e^4$. Slide $f$ is mounted so as to allow free movement to the indexing disc $y$ in any direction except the vertical and is guided only by the rounded end $f'$. Normally the slide $f$ is adapted to be disposed in the groove in bracket $e$ so that the axis of disc $y$ lies in the line including the axes of discs $x$ and $z$. Slide $f$ is formed with a slot $f^2$ adapted to receive the shorter arm $o'$ of a stylus $o$ fulcrumed on the bracket $e$ at $o^2$. The longer arm of stylus $o$ extends over the disc $x$ and a card or the like $h$ concentric with disc $x$ is adapted to be clamped to rotate as one therewith by means of the knurled head $c^9$ on the spindle $c^3$. The stylus $o$ is so formed as to contact with the card as will be readily understood.

The operation of the apparatus is as follows:

Rotary movement is imparted to the rotating bodies to be tested by any convenient means. In testing gears it is preferred to rotate one gear, say the gear $g'$, by hand. Gear $g'$ being rigid with the sleeve $b^3$ and friction disc $z$ will cause the rotation of the said friction disc in the same direction. Being in mesh with gear $g$, it will cause that gear to rotate in the opposite direction. As gear $g$ is rigid with the sleeve $a^3$ rotation of the friction disc $d$ will be effected. Disc $x$, being always held in frictional engagement with disc $d$ by springs $s$, will be caused to rotate in a direction opposite to the direction of rotation of the disc $z$ and at a rate proportional therewith. Thus it will be seen that discs $x$ and $z$ are caused to rotate in synchronism with the gears. Disc $y$ is disposed between and in frictional engagement with discs $x$ and $z$ and any change in the relative angular velocity of the two outer discs will cause the axis of disc $y$ to change its position with respect to the plane including the axes of discs $x$ and $y$ as explained in connection with Figure 6. As any change in the position of the axis of the disc $y$ will be transmitted to the stylus $o$. A record of the variations in the position of the disc $y$ will be indicated on the card $h$ by the stylus. It will be apparent that if the teeth of one or both of the coacting gears be inaccurately formed and one of the gears is rotated with constant angular velocity that the other gear will be caused to have an irregular movement. This irregular movement will be transmitted to the disc $x$ and will cause it to rotate with varying angular velocity, while the disc $z$ will be caused to rotate with constant angular velocity. A differential angular velocity will thus arise between the two discs which will cause the middle disc to move accordingly. This movement, being impressed on the stylus, will cause it to trace on the indicator card a record of movement of the axis of disc $y$ and thus an indication of the imperfections of the gear or gears will be obtained.

Various modifications may be made in an apparatus designed to operate according to the principle hereinbefore described while it may be adapted to various purposes besides testing gears and no limitation by the foregoing description is intended except as indicated in the accompanying claims.

What I claim is:

1. In an apparatus for indicating differential angular velocity between rotary members in combination with two rotating members whose differential angular velocity is to be indicated, other members rotated synchronously with said members respectively, another member rotated by direct frictional engagement with said second named members and means to indicate differential rotation of the first mentioned members by bodily displacement of the last mentioned member.

2. In an apparatus for indicating differential angular velocity between rotary members in combination with two rotating members whose differential angular velocity is to be indicated, two friction discs mounted on fixed axes and rotated synchronously with said members respectively, a disc in direct frictional engagement with said first mentioned discs and arranged to be displaced by the effect of the differential rotation of the first mentioned discs thereon and means actuated by such displacement to indicate such differential rotation.

3. In an apparatus for indicating differential angular velocity between rotary members, in combination with two rotary members whose differential angular velocity is to be indicated, three discs disposed in the same plane with their axes lying in the same plane, the two outer discs being rotated synchronously with said members respectively, the middle disc movable transversely of the said plane including the axes of the outer discs and indicating mechanism actuated by the middle disc in its transverse movement.

4. In an apparatus for indicating differential angular velocity between rotary members, in combination with two rotary members whose differential angular velocity is to be indicated, three discs disposed in a common plane with their axes disposed in the same plane, the two outer of said three discs being mounted on fixed centers and the middle disc being rotatably mounted on a slide the axis of said middle disc being normally disposed in the plane including the axes of the outer discs, a stylus actuated by said slide and a record holding member adapted to rotate in unison with one of the outer discs to be marked by the stylus.

5. In an apparatus for indicating differential angular velocity between rotary members, in combination with two rotary members whose differential angular velocity is to be indicated, two friction discs rotated synchronously with said members, a third disc rotated by one of said first mentioned discs in synchronism therewith, another disc in frictional engagement with first mentioned two discs and mounted on a slide, a stylus mounted on a pivot relatively stationary with respect to the slide but actuated thereby and a record disc carried with the third disc and in contact with the stylus.

6. In a gear testing machine, two relatively movable spindles, co-acting gears rotatably mounted on said spindles, friction discs mounted on said spindles and rotating in unison with said gears, a supporting arm rotatably mounted on one of said spindles and carrying two discs in frictional engagement and with their axes in a line including said spindle, and means for maintaining one of the discs on the arm in frictional contact with the disc on the other spindle, the axis of the other disc on the arm being free to move, and means for indicating the movement of said axis.

This specification signed this 7th day of September A. D. 1923.

GOTTFRIED WIRRER.